(12) United States Patent
Kim

(10) Patent No.: US 7,917,476 B2
(45) Date of Patent: Mar. 29, 2011

(54) DEVICE MANAGEMENT SYSTEM USING LOG MANAGEMENT OBJECT AND METHOD FOR GENERATING AND CONTROLLING LOGGING DATA THEREIN

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 12/065,746

(22) PCT Filed: Sep. 29, 2006

(86) PCT No.: PCT/KR2006/003946
§ 371 (c)(1),
(2), (4) Date: Mar. 5, 2008

(87) PCT Pub. No.: WO2007/040325
PCT Pub. Date: Apr. 12, 2007

(65) Prior Publication Data
US 2008/0195671 A1    Aug. 14, 2008

(30) Foreign Application Priority Data

Oct. 1, 2005    (KR) .................. 10-2005-0092673

(51) Int. Cl.
*G06F 7/00* (2006.01)
*G06F 17/00* (2006.01)
(52) U.S. Cl. ........ 707/661; 707/665; 707/672; 711/161; 711/162
(58) Field of Classification Search ............ 707/790, 707/802, 803, 609, 661, 665, 672; 711/161, 711/162
See application file for complete search history.

(56) References Cited

U.S. PATENT DOCUMENTS

| 5,165,018 A | 11/1992 | Simor |
| 5,987,506 A * | 11/1999 | Carter et al. .................. 709/213 |
| 6,466,971 B1 | 10/2002 | Humpleman et al. |

(Continued)

FOREIGN PATENT DOCUMENTS

CN    1498375 A    5/2004

OTHER PUBLICATIONS

Auletta et al. "Multiple templates access of trees in parallel memory systems", IEEE, 1997, pp. 694-701. Download: http://ieeexplore.ieee.org/stamp/stamp.jsp?arnumber=580980&tag=1.*

(Continued)

*Primary Examiner* — Jean B. Fleurantin
*Assistant Examiner* — Hares Jami
(74) *Attorney, Agent, or Firm* — Birch, Stewart, Kolasch & Birch, LLP

(57) ABSTRACT

A device management (DM) system using a log management object and a method for effectively generating and controlling logging data in the system are disclosed. A DM server includes only information that a client can transfer processing of a corresponding command to a logging sub-tree manager in the logging data storage command and transmits it, and an accurate location at which the logging data is to be stored is determined by the logging sub-tree manager by itself by using control information of the logging sub-tree upon receiving the logging data storage command. Each node storing the logging data has a source attribute value and a reason attribute value. Accordingly, the DM server or a scheduling context does not involve in a complicate logging data storage procedure, and when logged node is checked, the particulars of the logged data can be easily recognized.

10 Claims, 3 Drawing Sheets

U.S. PATENT DOCUMENTS

| | | | |
|---|---|---|---|
| 6,505,205 B1 * | 1/2003 | Kothuri et al. | 707/999.001 |
| 6,574,662 B2 | 6/2003 | Sugiyama et al. | |
| 2001/0042240 A1 * | 11/2001 | Ng et al. | 717/3 |
| 2002/0184366 A1 * | 12/2002 | Kimoto et al. | 709/224 |
| 2003/0103484 A1 | 6/2003 | Oommen et al. | |
| 2005/0108469 A1 * | 5/2005 | Freeman et al. | 711/105 |
| 2008/0168127 A1 * | 7/2008 | Hernandez | 709/202 |

OTHER PUBLICATIONS

Auletta et al., "Optimal Tree Access by Elementary and Composite Templates in Parallel Memory Systems", IEEE, 2002, pp. 399-411. Download: http://ieeexplore.ieee.org/stamp/stamp.jsp?arnumber=995820&tag=1.*

* cited by examiner

[Fig. 1]
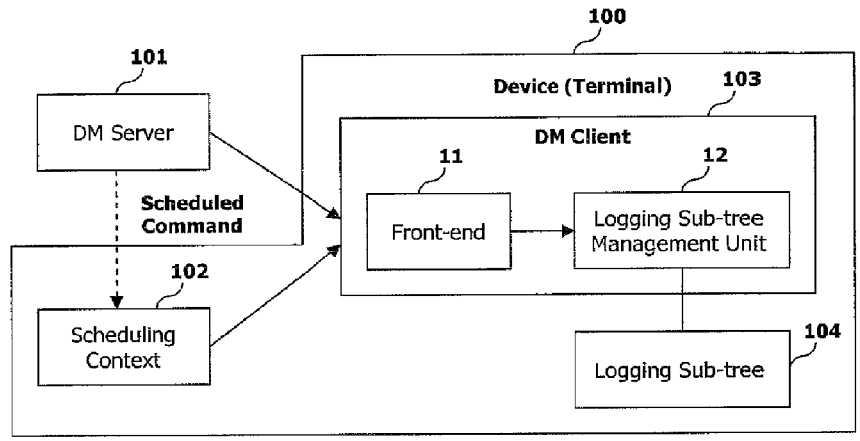
[Fig. 2]
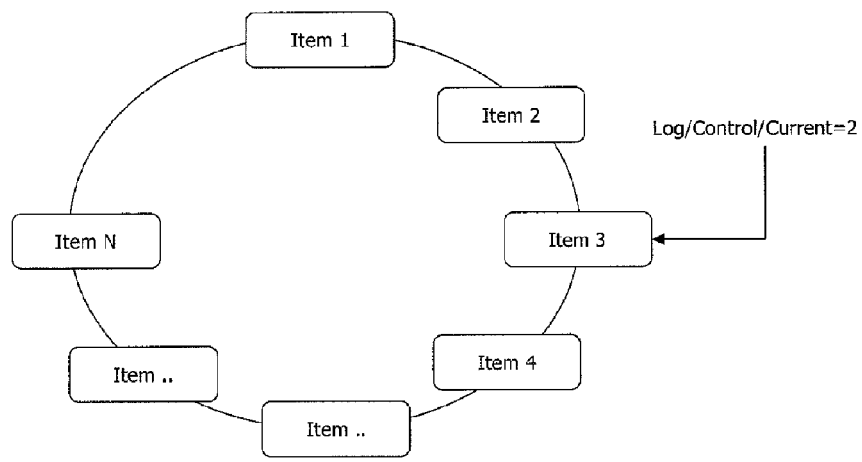
[Fig. 3]
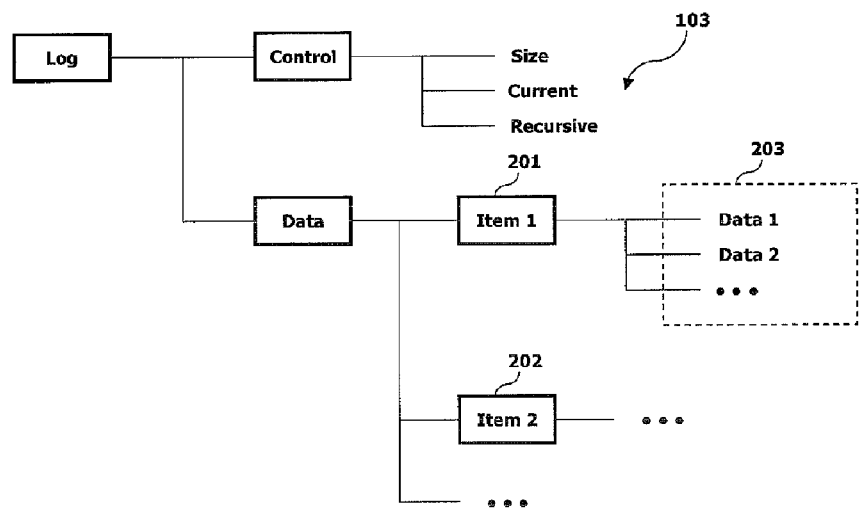

[Fig. 4]
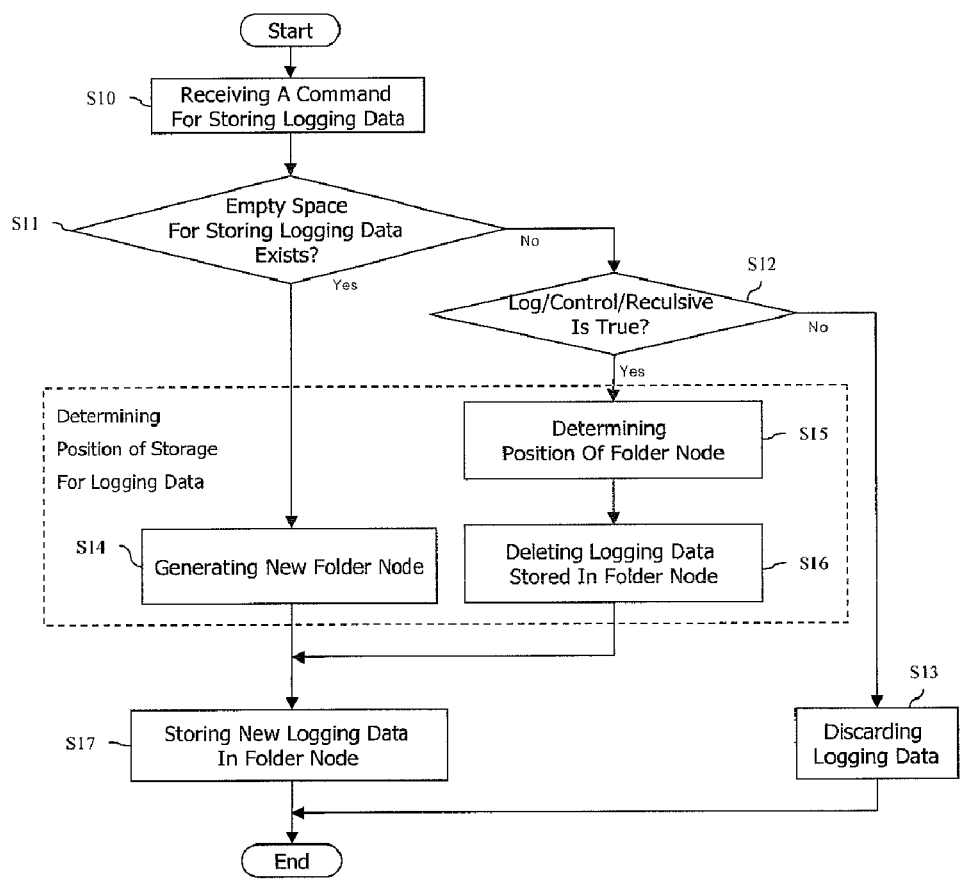

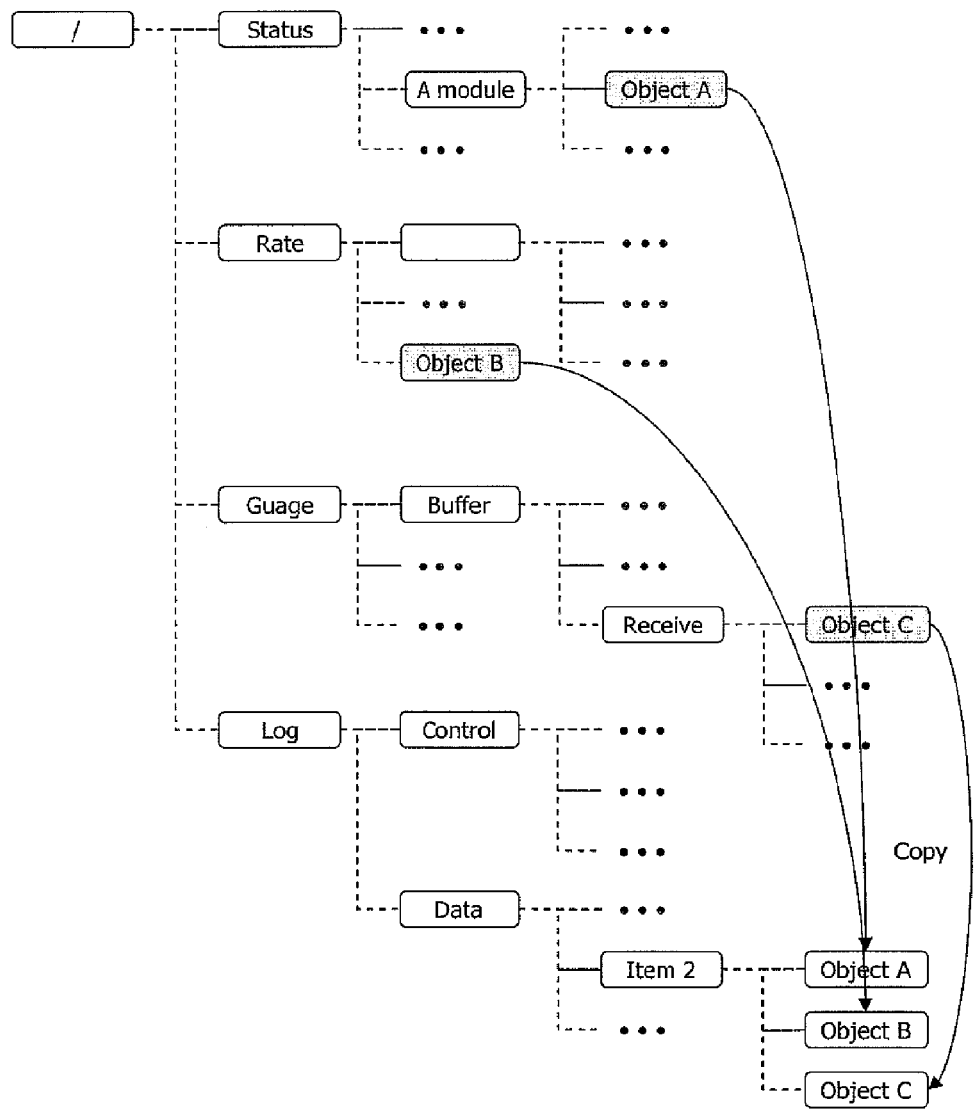
[Fig. 5]

DEVICE MANAGEMENT SYSTEM USING LOG MANAGEMENT OBJECT AND METHOD FOR GENERATING AND CONTROLLING LOGGING DATA THEREIN

TECHNICAL FIELD

The present invention relates to a device management and, more particularly, to a device management (DM) system using a log management object and a method for effectively generating and controlling logging data in the system.

BACKGROUND ART

In general, a DM technique is a technique that when a particular processing command is received from a DM server, a DM client performs the corresponding command.

In the DM technique, a certain device (e.g., terminal) makes a state value changing while an operation is being performed or a periodically (or when an event occurs) measured value DM object of a DM tree and stores a corresponding value in the DM object whenever the values change. Accordingly, the DM server remotely reads and checks the state value or the measured value stored in the DM object through the DM technique.

However, a state value or a measured value may be lost as it is updated with a new value unless it is not immediately read, so the server should perform a procedure for opening a DM session and reading corresponding values each time.

Thus, in case of a very frequently updated state value or measured value or in case of very quickly responding to a changed state, the server is to very frequently open the DM session, which disadvantageously causes an excessive network load and operation costs. In addition, when it is not possible to connect the DM server and a device, for example, when the device is in a shadow area in a wireless environment, the server cannot read the corresponding values. In this case, logging is necessary to read the corresponding state value or the measured value at a time point when an event occurs or periodically and store it in a region so that the server can read it later.

DISCLOSURE OF INVENTION

Technical Problem

In the related art DM technique, the logging is performed through a quite complicate process. Thus, in the DM technique, various state values or measured values at a certain time point or at the time when an event occurs are stored as a single group, the corresponding group can properly represent the state of the device at the time point when the logging occurs.

However, the related art DM technique does not directly provide a logging performing function. Anyhow, the related art DM technique can support the logging function when using a DM scheduling technique, but in such a case, the DM server has a burden of being directly involved in a complicate logging data storage procedure, and in particular, the DM server cannot know which data has been logged or why it has been logged when it checks logged nodes.

In addition, in the related art DM technique, because a DM command needs an accurate URI, the DM server must recognize a state of a currently logging storage and determine a location for new storing. That is, a very complicate and inefficient procedure is to be performed.

Technical Solution

One exemplary feature of the present invention is to provide a device management (DM) system capable of effectively storing logging data (various state values or measurement values) at a certain time point or when an event occurs as a group (data node) in a DM tree, and a logging data generating method.

Another exemplary feature of the present invention is to provide a DM system capable of allowing a DM server to easily recognize histories of stored logging data (various state values or measured values) by also storing an attribute value of the logging data when the logging data is stored as a single group in a DM tree, and a logging data generating method.

Still another exemplary feature of the present invention is to provide a DM system for allowing a DM server to remotely control generation of logging data through a logging sub-tree, and a logging data control method.

To implement at least the above features in whole or in parts, the present invention provides a method for generating and controlling logging data in a DM system including: creating a logging sub-tree including nodes for controlling a location in the DM tree where logging data is to be stored and a way how to store the logging data.

To implement at least the above features in whole or in parts, the present invention also provides a method for generating and controlling logging data in a DM system including: receiving a command for storing logging data; and determining, a location for storing the logging data in a logging data and storing it in the determined location in the logging sub-tree.

The storage command may indicate a URI of a location where a DM object and a value of the DM object are to be stored, and the URI can be Log/Data.

The storage command is a copying (duplicating) command that commands duplicating of a value of a certain DM object to the logging sub-tree.

The logging sub-tree management unit performs the command for storing the logging data only when the storage command instructs the Log/Data as a location for storing the logging data, and the storage command is received from the DM server or a scheduling context.

The logging sub-tree may include a Log/Control node; a control part including control nodes, which are connected with the Log/Control node, for controlling a way how to store the logging data; a Log/Data node; and a data part, which is connected with the Log/Data node, for storing the logging data.

The control part may include Size, Current and Recursive nodes. In this case, the Size node may indicate the maximum number of logging data that can be stored, the Current node indicates a location where the next logging data is to be stored, and the Recursive node indicates how to process new logging data when the storage space for logging data is full.

The Recursive node can be controlled remotely by the DM server and accordingly, the logging data storage method can be controlled.

The data part may include a plurality of folder nodes and at least one or more data nodes which are connected with each folder node and actually store the logging data.

The logging sub-tree management unit determines the location for storing the logging data with reference to a value of the control part of the logging sub-tree.

The storing of the logging data includes: checking whether there is an empty logging storage space; generating a new folder node and storing the logging data when there is an empty space; checking whether a Log/Control/Recursive value within the logging sub-tree is true when there is no empty space; determining a location of a folder node to be updated with reference to a Log/Control/Current value, if the Log/Control/Recursive value is true; deleting every data node included in the determined folder node and storing the logging data.

The storing of the logging data may further include discarding the logging data if there is no empty storage space and the Log/Control/Recursive value is false.

When the logging data is stored, a source attribute value and a reason attribute value can be also stored together in each data node storing the corresponding logging data.

The source attribute value is the original URI of the logging data, and the reason attribute value is a scheduling context ID for indicating a cause of the logging to allow a DM server to recognize it.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

Advantageous Effects

The DM system using the log management object and the method for generating and controlling the logging data in the DM system according to the present invention have many advantages.

That is, for example, first, because the DM server instructs only the copying command and storing of the logging data is substantially performed by the logging sub-tree management unit within the DM client, the burden of performing the logging storage management operation by the DM server as in the related art can be reduced.

Second, when the logging data is stored in each node, the source and reason attribute values are also stored in each node, so that the DM server can easily recognize the histories of the logging data (e.g., which data has been logged or for what reason the data has been logged, etc.) when checking the logged nodes.

Third, the device records and stores a state value changing while a certain operation is performed or a value measured periodically or when an event occurs in the DM tree, and when specific conditions are established, the device reports it to the DM server, to thereby prevent a loss of data and effectively use network resources.

BRIEF DESCRIPTION OF THE DRAWINGS

The invention will be described in detail with reference to the following drawings in which like reference numerals refer to like elements wherein:

FIG. 1 is a schematic block diagram of a DM system for logging data according to an exemplary embodiment of the present invention;

FIG. 2 is a view showing a detailed structure of a logging sub-tree in FIG. 2;

FIG. 3 is a view showing a method for allocating a storage space for storing logging data;

FIG. 4 is a flow chart illustrating the processes of a method for generating and controlling logging data in the DM system according to the exemplary embodiment of the present invention; and FIG. 5 is a view showing an example that when one operation is performed and logging data is stored, a source attribute value and a reason attribute value are stored together.

MODE FOR THE INVENTION

The exemplary embodiment of the present invention will now be described as follows.

In the present invention, a device management (DM) server does not accurately indicate a URI of a location where logging data is to be stored in a command for storing the logging data but merely include information allowing a front end of a DM client to transfer processing of the corresponding command to a logging sub-tree management unit, and the logging sub-tree management unit, which has received the storage command, determines an accurate location where the logging data is to be stored, and then stores the logging data according to the determination. According to this method, the management of logging storage is entrusted to a logging sub-tree manager so that the DM server or a scheduling context is not involved in a complicate logging data storage procedure.

In the present invention, a source attribute value and a reason attribute value are stored together in each node when the logging data is stored. Preferably, the original URI of logging data is stored as the source attribute value, and information allowing to know a cause of logging, for example, a scheduling context ID, is stored as the reason attribute value. Accordingly, when the DM server checks the logged nodes, it can be aware which data has been logged or why the data has been logged.

FIG. 1 is a schematic block diagram of a DM system for logging data according to an exemplary embodiment of the present invention.

As shown in FIG. 1, the DM system for generating logging data according to the present invention includes a device (terminal) 100 and a DM server 101.

The device 100 includes a scheduling context 102, a DM client 103 and a logging sub-tree 104. The DM client 103 includes a front end 11 and a logging sub-tree management unit 12.

The DM client 103 receives a DM command for storing logging data from the DM server 101 or the scheduling context 102. The scheduling context 102 includes the DM command and a condition for performing the DM command i.e. a particular time point when to perform the DM command.

The DM server 101 (or the scheduling context 102) uses a command (e.g., copy command) for copying a value of a certain DM object in the logging sub-tree (Log/Data) as the DM command for storing the logging data. Preferably, the copying command defines merely Log/Data, not a URI of the accurate data storage location likewise as in the related art. Namely, the Log/Data can be taken as an example as the URI for indicating a storage location of the logging data.

The front end 11 checks whether the DM command includes the Log/Data, and if the DM command includes the Log/Data, the front end 11 transfers the corresponding command to the logging sub-tree management unit 12. Upon receiving the copying command defining the Log/Data from the front end 11, the logging sub-tree management unit 12 determines the location for storing the logging data according to its logging data storage management policy and way.

As shown in FIG. 2, the logging sub-tree 104 includes DM nodes such as a log node, a Log/Control node, a Log/Data node, a Log/Control/Size node, a Log/Control/Current node, a Log/Control/Recursive node, a Log/Data/Item1, 2, . . . , Log/Data/Item 1/Data 1, 2, . . . , etc.

The logging sub-tree 104 is a part for recording/storing a changing state value or a changing measurement value measured periodically or when a certain event occurs, including a control part and a data part. The control part includes Size, Current, and Recursive nodes located in the Log/Control node and is used for controlling a way how to store and record the logging data. The data part is located in the Log/Data node and provides a space, namely, a buffer, for storing the logging data.

Of the control part, the Log/Control/Size node indicates the maximum number of logging data that can be stored in the Log/Data nodes, and the Log/Control/Current node indicates a location where the next logging data is to be stored. For example, when a value of the Log/Control/Current node is 0, the next logging data is stored in the Log/Data/Item 1, and when the value of the Log/Control/Current nodes is 1, the next logging data is stored in the Log/Data/Item 2. In addition, when new logging data is stored, the Log/Control/Current value is updated to indicate the next storage space. Namely, because a current value of the Log/Control/Current node means a location of an item that finally occupies up to the present, when the copying command is received, the logging sub-tree 104 stores the logging data at a location following the present current node.

The Log/Control/Recursive node indicates how to process newly generated logging data when the logging data storage space is all occupied with no empty space. If the value is True, the Log/Control/Recursive node deletes the oldest logging data and stores the new logging data in the corresponding empty space. If the value is False, the newly generated logging data is all discarded. In this case, the oldest logging data item is determined by the value of the Log/Control/Current node.

FIG. 3 is a view showing how to delete the oldest logging data and store the newly generated logging data in the corresponding space. Specifically, FIG. 3 shows a process of storing the newly generated logging data in Item 3, the oldest logging data item when there are N number of Log/Control/Size nodes, the Log/Control/Recursive value is True and the Log/Control/Current value is 2. Every logging data at the data part is store din the Log/Data node.

The operation of generating the logging data in the DM system for generating and controlling the logging data according to the present invention will now be described in detail.

FIG. 4 is a flow chart illustrating the processes of a method for generating and controlling logging data in the DM system according to the exemplary embodiment of the present invention.

As shown in FIG. 4, the DM client 103 receives a DM command (e.g., copying command) for storing the logging data from the DM server 101 or the scheduling context 102 of the device 100 (step S10). The command includes an object to be logged (logging data) and a URI of a location where the object to be logged is to be stored, and the location where the logging data is to be stored is Log/Data. For example, when it is assumed that the command is Copy/Status/A module/Object A to Log/data, the logging data is Object A and the location where the logging data is to be stored is Log/Data.

When the URI comprised in the received command (i.e, copying command) indicates the sub-tree (Log/Data), the front end 11 of the DM client 103 commits processing of the corresponding command to the logging sub-tree management unit 12, and then the logging sub-tree management unit 12 checks whether there is an empty logging data storage space with reference to a value of the control part (Log/Control) of the logging sub-tree 104 (step S11). If there is no empty space, the logging sub-tree management unit 12 checks whether the Log/Control/Recursive node value is True (step S12). If the value is False, the logging sub-tree management 12 discards the received logging data (step S13).

If, however, there is an empty space or the Log/Control/Recursive value is True, the logging sub-tree management unit 12 determines a location for storing the logging data. Namely, when there is an empty space, as shown in FIG. 2, the logging sub-tree management unit 12 generates new folder nodes 201 and 202 and stores the new logging data in the new folder nodes (steps S14 and S17). In this case, as shown in FIG. 2, the name of the newly generated folders starts from an Item such as Item n and ends with a number of an integer value, and is determined to be sequentially increase from 1 to Log/Control/Size.

If there is no empty space but the Log/Control/Recursive value is True, the location of a folder node for over-writing is determined with reference to the Log/Control/Current value (step S15). For example, when it is determined to over-write logging data in the folder node 201, the logging sub-tree management unit 12 deletes every data nodes 203 (the old logging data) included in the folder nodes 201 and stores the newly received logging data therein (steps S16 and S17). In this case, the storing of the logging data is made by generating the new nodes 203. The value of the logging data object is stored in the newly generated nodes, and the original URI (source attribute value) of the logging data and information (reason attribute value) regarding the cause of the logging are stored as the attribute values of the newly generated nodes. Accordingly, when the DM server 101 checks the logged nodes, it can know which data has been logged or for what reason they has been logged.

In particular, in the step S10, the DM server 101 does not accurately define the location for storing the logging data within the DM command. The reason is because the accurate location is determined by the DM client, the DM server 101 cannot know the accurate location in advance. Namely, when the DM server 101 issues the command for storing the new logging data, it cannot know where of the Item 1, Item 2, . . . , Item N the new logging data is to be stored. Thus, when the DM server issues the command for storing the new logging data, it simply defines a location where the logging data is to be stored as Log/Data.

Accordingly, upon receiving the logging data storage command, the front end 11 of the DM client 102 checks the Log/Data included in the corresponding command and determines whether to transfer the received DM command to the logging sub-tree management unit 12. Upon receiving the command, the logging sub-tree management unit 12 itself determines the accurate location where the logging data is to be stored, among Item 1, Item 2, . . . , Item N.

FIG. 5 shows a method for storing objects A, B and C in the logging sub-tree when the firmware upgrading operation is failed.

First, when the DM server 101 issues the command for storing the new logging data, it defines the location where the logging data is to be stored as the Log/Data and transmits it.

Namely, the DM server 101 transmits a Copy/Status/A module/Object A to Log/data command in order to store the object A in the logging sub-tree, transmits Copy/Rate/Object B to Log/data command in order to store the Object B in the logging sub-tree, and transmits Copy/Gauge/Buffer/Receive/Object C to Log/data command in order to store Object C in the logging sub-tree.

The front end 11 of the DM client 103 checks the Log/data of the command and transmits the corresponding commands to the logging sub-tree management unit 12, and the logging sub-tree management unit 12 stores the objects A, B and C in the logging sub-tree 104.

Accordingly, a new Item2 Is generated below ./Log/Data, and three new nodes Item2/ObjectA, Item2/ObjectB and Item2/ObjectC are generated below Item2 And the values of the Object A, B and C are stored. In this case, a source attribute value and a reason attribute value are also stored together for each of Item2/ObjectA, Item2/ObjectB and Item2/ObjectC nodes. The source attribute values of the Item2/ObjectA, Item2/ObjectB and Item2/ObjectC are ./Status/Amodule/ObjectA, ./Rate/ObjectB and ./Gauge/Buffer/Receive, and the reason attribute values of the three newly generated nodes indicate an ID of the scheduling context.

As so far described, the DM system using the log management object and the method for generating and controlling the logging data in the DM system according to the present invention have many advantages.

That is, for example, first, because the DM server instructs only the copying command and storing of the logging data is substantially performed by the logging sub-tree management unit within the DM client, the burden of performing the logging storage management operation by the DM server as in the related art can be reduced.

Second, when the logging data is stored in each node, the source and reason attribute values are also stored in each node, so that the DM server can easily recognize the histories of the logging data (e.g., which data has been logged or for what reason the data has been logged, etc.) when checking the logged nodes.

Third, the device records and stores a state value changing while a certain operation is performed or a value measured periodically or when an event occurs in the DM tree, and when specific conditions are established, the device reports it to the DM server, to thereby prevent a loss of data and effectively use network resources.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for generating and controlling logging data in a device management (DM) system comprising:
   receiving, by a DM client, a command for storing logging data from a DM server;
   determining, by the DM client, a position for storing the logging data in a logging sub-tree,
   wherein the logging sub-tree comprises a 'Control' node; a control part connected with the 'Control' node for controlling a method for storing the logging data; a 'Data' node; and a data part connected with the 'Data' node for providing a space for storing the logging data,
   wherein the control part comprises a 'Size' node indicating a maximum number of logging data that can be stored, a 'Current' node indicating a position where a next logging data is to be stored, and a 'Recursive' node indicating how to process new logging data when the space for storing the logging data is full; and
   storing, by the DM client, the logging data in the determined position in the logging sub-tree,
   wherein the step of storing the logging data comprises:
      checking, by the DM client, whether there is an empty logging storage space;
      if there is an empty logging space, generating, by the DM client, a new folder node indicated by a value of the 'Current' node and storing the logging data in the new folder node;
      if there is no empty space, checking, by the DM client, whether a value in the 'Recursive' node within the logging sub-tree is true;
      determining, by the DM client, a position of a node to be deleted with reference to a value of the 'current' node if the value of the 'Recursive' node is true; and
      deleting, by the DM client, all data included in the determined node and storing the logging data.

2. The method of claim 1, wherein the command for storing logging data includes a DM object to be logged and a Uniform Resource Identifier (URI) of a position where a value of the DM object is to be stored.

3. The method of claim 1, wherein the command for storing logging data is a copy command for duplicating a value of a certain DM object to the logging sub-tree.

4. The method of claim 1, wherein the logging sub-tree management unit responds to the command for storing logging data only when the command for storing logging data instructs the 'Data' node as a storage position of the logging data.

5. The method of claim 1, wherein the command for storing logging data is received from the DM server or a scheduling context.

6. The method of claim 1, wherein the data part comprises:
   a plurality of folder nodes; and
   at least one or more data nodes which are connected with each folder node to store the logging data.

7. The method of claim 1, further comprising:
   discarding the logging data if there is no empty storage space and the value of the 'Recursive' node is false.

8. The method of claim 1, wherein a name of the generated new folder node increases sequentially from 1 up to a value of the 'Size' node.

9. The method of claim 1, wherein when the logging data is stored, a source attribute value for indicating an original Uniform Resource Identifier (URI) of the logging data and a reason attribute value for indicating a cause of the logging are also stored together in each data node that stores the corresponding logging data.

10. The method of claim 9, wherein the reason attribute value is a scheduling context ID.

* * * * *